(12) United States Patent
Francois et al.

(10) Patent No.: US 9,232,223 B2
(45) Date of Patent: Jan. 5, 2016

(54) METHOD FOR DECODING A STREAM REPRESENTATIVE OF A SEQUENCE OF PICTURES, METHOD FOR CODING A SEQUENCE OF PICTURES AND CODED DATA STRUCTURE

(75) Inventors: Edouard Francois, Cesson Sevigne Cedex (FR); Dominique Thoreau, Cesson Sevigne Cedex (FR); Fabien Racape, Cesson Sevigne Cedex (FR)

(73) Assignee: THOMSON LICENSING, Issy les Moulineaux (FR)

( * ) Notice: Subject to any disclaimer, the term of this patent is extended or adjusted under 35 U.S.C. 154(b) by 648 days.

(21) Appl. No.: 13/138,240

(22) PCT Filed: Jan. 29, 2010

(86) PCT No.: PCT/EP2010/051041
§ 371 (c)(1),
(2), (4) Date: Jul. 22, 2011

(87) PCT Pub. No.: WO2010/086393
PCT Pub. Date: Aug. 5, 2010

(65) Prior Publication Data
US 2011/0280309 A1    Nov. 17, 2011

(30) Foreign Application Priority Data
Feb. 2, 2009 (FR) ....................... 09 50641

(51) Int. Cl.
*H04N 7/26* (2006.01)
*H04N 7/32* (2006.01)
(Continued)

(52) U.S. Cl.
CPC ......... *H04N 19/105* (2014.11); *H04N 7/26015* (2013.01); *H04N 7/26037* (2013.01);
(Continued)

(58) Field of Classification Search
CPC .......... H04N 7/26015; H04N 7/26037; H04N 7/26058; H04N 7/26132; H04N 19/105; H04N 19/176; H04N 19/70; H04N 19/192; H04N 19/109; H04N 19/117; H04N 19/137; H04N 19/61
USPC ........... 375/240.16, 240.24, 240.25; 382/270, 382/272, 274, 275
See application file for complete search history.

(56) References Cited

U.S. PATENT DOCUMENTS 6,041,145 A * 3/2000 Hayashi et al. ............... 382/268
2004/0071210 A1 4/2004 Amara et al.
(Continued)

FOREIGN PATENT DOCUMENTS

CN 1984340 6/2007
GB 2444992 6/2008
(Continued)

OTHER PUBLICATIONS

Kamikura et al. "Video Coding Using Global Motion and Brightness-Variation Compensation with Complexity Reduction". Electronics and Communications in Japan, Part 1, vol. 86, No. 2, 2003, pp. 80-93. Translated from Denshi Joho Tsushin Gakkai Ronbunshi, vol. J82-B, No. 9, Sep. 1999, pp. 1676-1688.*
(Continued)

*Primary Examiner* — Christopher S Kelley
*Assistant Examiner* — Zhihan Zhou
(74) *Attorney, Agent, or Firm* — Tutunjian & Bitetto, P.C.

(57) ABSTRACT

A method for decoding a stream of coded data representative of a sequence of pictures is described. The method comprises the following steps: decoding at least one part of the stream into decoded data, selecting a brightness variation model representative of a brightness variation between the pictures of the sequence from a set of at least two brightness variation models, and reconstructing the picture data from decoded data by taking into account the brightness variation model. A method for coding a picture sequence and a data structure are further disclosed.

30 Claims, 9 Drawing Sheets

(51) Int. Cl.

| | |
|---|---|
| *H04N 19/105* | (2014.01) |
| *H04N 19/102* | (2014.01) |
| *H04N 19/137* | (2014.01) |
| *H04N 19/117* | (2014.01) |
| *H04N 19/103* | (2014.01) |
| *H04N 19/176* | (2014.01) |
| *H04N 19/70* | (2014.01) |
| *H04N 19/61* | (2014.01) |
| *H04N 19/109* | (2014.01) |
| *H04N 19/192* | (2014.01) |

(52) U.S. Cl.
CPC ....... *H04N7/26058* (2013.01); *H04N 7/26132* (2013.01); *H04N 19/109* (2014.11); *H04N 19/117* (2014.11); *H04N 19/137* (2014.11); *H04N 19/176* (2014.11); *H04N 19/192* (2014.11); *H04N 19/61* (2014.11); *H04N 19/70* (2014.11)

(56) References Cited

U.S. PATENT DOCUMENTS

| | | | | |
|---|---|---|---|---|
| 2006/0245498 | A1* | 11/2006 | Lee et al. | 375/240.16 |
| 2007/0098067 | A1* | 5/2007 | Kim et al. | 375/240.08 |
| 2007/0147407 | A1 | 6/2007 | Binder | |
| 2007/0147507 | A1* | 6/2007 | Koto et al. | 375/240.16 |
| 2008/0101709 | A1 | 5/2008 | Guleryuz et al. | |
| 2008/0253456 | A1* | 10/2008 | Yin et al. | 375/240.16 |

FOREIGN PATENT DOCUMENTS

| | | |
|---|---|---|
| WO | WO2005022919 | 3/2005 |
| WO | WO 2006/033953 | 3/2006 |
| WO | WO2006128072 | 11/2006 |
| WO | WO2007094792 | 8/2007 |

OTHER PUBLICATIONS

Kamikura et al. "A Study on Multi Parameters Estimation in Global Brightness-Variation Compensation (Weighted Prediction)". ITE Technical Report, Feb. 4, 2004. Translated Aug. 2014 by FLS, Inc.*
Kimta et al. "A Study on Weight Parameter Estimation for Weighted Prediction of H.264/AVC". ITE Technical Report, Sep. 2003. Translated Aug. 2014 by Schreiber Translations, Inc.*
Kamikura et al. "Global Brightness-fluctuation Compensation in Video Coding". NTT Human Interface Laboratories, 1996. Translated Aug. 2014 by Phoenix Translations.*
Debing Liu etal: "Linear Transform Based Motion Compensated Prediction for Luminance Intensity Changes",IEEE,May 23, 2005,pp. 304-307.
Yunfei Zheng etal: "Intra prediction using template matching with adaptive illumination compensation", Image Processing, 2008, IEEE,Oct. 12, 2008, pp. 125-128.
Search Report Dated Apr. 26, 2010.
Gao et al,: "Verification JVT-Y048: Qualcomm's CE1 proposal", JVT of ISO/IEC MPEG & ITU-T VCEG, Shenzhen, CN, Oct. 21-26, 2007.
Huo et al, "Illumination and Color Compensation for MVC" JVT of ISO/IEC MPEG & ITU-T VCEG, Shenzhen, CN, Oct. 21-26, 2007.
Yang, "CE09: Derivation of MVC IC Infomation", JVT of ISO/IEC MPEG & ITU-T VCEG, Marrakech, Morocco, Jan. 13-19, 2007.
Lee et al. "Illumination Compensation", JVT of ISO/IEC MPEG & ITU-T VCEG, Hangzhou, China, Oct. 20-27, 2006.
Lopez et al. "Block-based Illumination Compensation and Search Techniques for Multiview Video Coding", IEEE ISCAS, Kobe, Japan, May 23-26, 2005.
Yin-et al. "Localized Weighted Predation for Video Coding" IEEE International Symposium on Circuits and Systems, Jan. 2005.
Kamikura et al.: A Study on Multi Parameters Estimation in Global Brightness-Variation Compensation (Weighted Prediction), ITE Technical Report, Feb. 4, 2004. Abstract and Figures.
Kimata et al.: A Study on Weight Parameter Estimation for Weighted Predition of H.2434/AVC, Abstract in English, ITE Technical Report, Sep. 26, 2003, Abstract and Figures.
Kamikura et al,: "Video Coding Using Global Motion and Brightness-variation Compensation with Complexity Reduction", vol. J82-B, No. 9, pp. 676-1688, Sep. 1999. Figures.
KAM1KURA et al, "Global Brightness-fluctuation Compensation in Video Coding", NTT Human Intterface Laboratories, published in 1966. Abstract and Figures.
Kamikura et al.: A Study on Multi Parameters Estimation in Global Brightness-Variation Compensation (Weighted Predition), ITE Technical Report, Feb. 4, 2004.
Kimata et al.: A Study on Weight Parameter Estimation for Weighted Predition of H.264/AVC, ITE Technical Report, Sep. 26, 2003.
Kamikura et al.: "Video Coding Using Global Motion and Brightness-variation Compensation with Complexity Reduction", vol. J82-B, No. 9, pp. 1676-1688, Sep. 1999.
Kamikura et al. "Global Brightness-fluctuation Compensation in Video Coding", NTT Human Intterface Laboratories, published in 1966.
Liu et al., "Linear Transform Based Motion Compensated Prediction for Luminance Intensity Changes", IEEE International Symposium on Circuits and Systems, May 23, 2005, vol. 1, pp. 304-307.
ITU-T H264 Standard, Series H: Audiovisual and Multimedia Systems, "Advanced Video Coding for Generic Audiovisual Services", ITU-T recommendation H264, Nov. 2007, pp. 1-564.
Cheung et al., "New Block-Based Motion Estimation for Sequences with Brightness Variation and Its Application to Static Sprite Generation for Video Compression", IEEE Transactions on Circuits and Systems for Video Technology, vol. 18, No. 4, Apr. 2008, pp. 522-527.
Harmanci et al., "Predictive compression and denoising with overcomplete decompositions: a simple way to reject structured interference", Proceedings of SPIE—The international society for optical engineering, vol. 6701, No. 1, Sep. 13, 2007, pp. 1-15.
Shen et al., "Adaptive weighted prediction in video coding", 2004 IEEE International Conference on Multimedia and Expo (ICME), Jun. 27, 2004, vol. 1, pp. 427-430.
Tang et al., "Algorithm and Hardware Architecture Design for Weighted Prediction in H264/MPEG-4 AVC", 2006 IEEE international symposium on circuits and systems, May 21, 2006, Island of Kos, pp. 5015-5018.
Kamp et al., "Decoder side motion vector derivation", ITU—Telecommunications Standardization Sector, VCEG-AG16, Video Coding Experts Group, 33rd meeting, Shenzhen, China, Oct. 20, 2007, pp. 1-24.
Zheng et al., "Intra prediction using template matching with adapative illumination compensation", 15th IEEE international conference on Image Processing, Oct. 12, 2008, pp. 125-128.

* cited by examiner

METHOD FOR DECODING A STREAM REPRESENTATIVE OF A SEQUENCE OF PICTURES, METHOD FOR CODING A SEQUENCE OF PICTURES AND CODED DATA STRUCTURE

This application claims the benefit, under 35 U.S.C. §365 of International Application PCT/EP2010/051041, filed Jan. 29, 2010, which was published in accordance with PCT Article 21(2) on Aug. 5, 2010 in English and which claims the benefit of French patent application No. 0950641, filed Feb. 2, 2009.

1. SCOPE OF THE INVENTION

The invention relates to the general field of the coding of picture sequences and of the decoding of coded data streams representative of picture sequences.

The invention notably relates to a method for decoding a stream representative of a sequence of pictures, a method for coding a sequence of pictures, the corresponding decoding and coding devices as well as a coded data structure.

2. PRIOR ART

Most coding/decoding methods use prediction between pictures or inter-picture prediction. Such a prediction is used to improve the compression of a sequence of pictures. It comprises in generating a prediction picture for a current picture having to be coded and in coding the difference between the current picture and the prediction picture, also called residual picture. The more the prediction picture is correlated with the current picture, the lower is the number of bits required to code the current picture and therefore the effective compression. However, inter-picture prediction loses its efficiency when there is a brightness variation between the pictures of the sequence. Such a brightness variation is for example due to a modification of illumination, to fade effects, to flashes, etc.

Methods for coding/decoding picture sequences are known that account for an overall brightness variation. Hence, within the framework of the standard H.264 described in the document ISO/IEC 14496-10, it is known to use a weighted prediction method in order to improve the compression in the case of a brightness variation. Such a method uses a unique brightness variation model that depends on a set of two parameters, a multiplicative parameter and an additive parameter. A single parameter set is associated with each reference picture for all the slices of the current picture. Hence, all the pixel blocks of the current picture that refer to a same reference picture will be predicted by taking into account a single brightness variation model. Such an approach is enough to model a variation of overall brightness that is applied uniformly to an entire picture and therefore effectively code all the blocks of a picture that are predicted from one and the same reference picture.

In the case where the brightness variation is not uniform throughout an entire picture, e.g. in the case of a change in local lighting or of flashes, several reference picture indices can be associated with a single reference picture stored in memory by using a tool of H.264 for reorganising reference pictures. This solution can use different weightings for blocks of a same picture even when they are predicted from the same reference picture. However, this solution lacks flexibility to the extent that the number of reference pictures that can be used within the framework of H.264 is limited by the profile and the level of the profile or by the complexity of the motion estimator. This solution thus considerably limits the effectiveness in the case of a local brightness variation.

Further, it is known how to assign different brightness variation models to each reference picture stored in memory. However, such a solution, although it allows the parameters of the model associated with a reference picture to be varied and therefore different weightings to be used for blocks of a same picture even when they are predicted from the same reference picture, does not allow the model to vary for these blocks of a same picture when they are predicted from the same reference picture.

3. SUMMARY OF THE INVENTION

The purpose of the invention is to compensate for at least one disadvantage of the prior art.

For this purpose, the invention relates to a method for decoding a stream of coded data representative of a sequence of pictures, the pictures comprising pixels with each of which at least one picture data is associated. The method according to the invention comprises the following steps:

decoding at least one part of the stream representative of picture data into decoded data, and reconstructing the picture data from the decoded data by taking into account at least one brightness variation model representative of a brightness variation between the pictures of the sequence.

According to one particularly advantageous embodiment, the method further comprises a selection step of the at least one brightness variation model from a set of at least two brightness variation models in such a manner as to minimize a modelling error.

Advantageously, the decoding method according to the invention can improve the quality of the reconstructed picture sequence for a given bitrate of the coded data stream, notably in the case of a local brightness variation.

According to a first embodiment, the pictures being divided into blocks, the brightness variation model is selected for a current block in such a manner as to minimize the mean quadratic error calculated between the previously reconstructed picture data of neighbouring pixels of the current block and picture data of corresponding pixels in a previously reconstructed reference picture filtered by the brightness variation model.

Advantageously, the selection step of the at least one brightness variation model for a current block comprises a sub-step for determining the parameters of each of the brightness variation models and a sub-step for selecting the brightness variation model according to previously reconstructed picture data of neighbouring pixels of said current block and picture data of corresponding pixels in a previously reconstructed reference picture filtered by the brightness variation model.

According to a particular characteristic, the corresponding pixels are neighbouring pixels of a block of the reference picture colocated with the current block.

According to a variant, the corresponding pixels are neighbouring pixels of a reference block of the reference picture identified by a reconstructed motion vector associated with the current block.

According to another particular characteristic, the coordinates of the motion vector associated with the current block are rounded to a whole pixel value.

According to another particular characteristic, the current block being divided into sub-blocks the selection step of the brightness variation model is applied separately to each sub-block.

Advantageously, the corresponding pixels for each of the sub-blocks are the neighbouring pixels of the reference block associated with the current block.

According to a particularly advantageous embodiment, the selection step comprises a sub-step for calculating the following sums:

the sum of the previously reconstructed picture data of the neighbouring pixels of the current block, called first sum, the sum of the picture data of corresponding pixels in the reference picture, called second sum, the squared sum of the picture data of corresponding pixels in the reference picture, called third sum, and the sum of the products of the previously reconstructed picture data of the neighbouring pixels of the current block and the picture data of corresponding pixels in the reference picture, called fourth sum.

According to this same embodiment, the parameters of each of the brightness variation models of the set are determined and a brightness variation model selected according to the sums.

This embodiment is particularly advantageous to the extent that the parameters of each of the brightness variation models are determined and a model selected directly in a single step from calculated sums.

According to a particular characteristic, the set of brightness variation models comprises at least two brightness variation models belonging to the set of the brightness variation models comprising:

an additive brightness variation model,
a multiplicative brightness variation model, and
linear brightness variation model of degree 1.

According to a particular characteristic, the parameter of the additive brightness variation model is calculated as being the difference between the first sum and the second sum divided by the number of neighbouring pixels of the current block.

According to another particular characteristic, the parameter of the multiplicative brightness variation model is calculated as being the division of the fourth sum by the third sum.

Advantageously, the multiplicative brightness variation model is selected if $\Delta d$ is positive and the additive brightness variation model is selected otherwise, with $\Delta d = (1+\hat{b}^2)*S_3 - 2*S_4 - N*\hat{a}^2$, where:

$\hat{b}$ is the parameter of the multiplicative brightness variation model, $\hat{a}$ is the parameter of the additive brightness variation model, $S_3$ is the third sum, and $S_4$ is the fourth sum, and N is the number of neighbouring pixels of the current block.

According to a particular embodiment, the decoding method according to the invention comprises a decoding step of an additional data (flag) indicating for a first block whether the first block is temporally predicted according to a temporal prediction mode taking into account a brightness variation model selected from a set of at least two brightness variation models.

According to another aspect of the invention, the decoding method according to the invention comprises a determination step of an additional data (flag) for a second block from the value of the additional data associated with previously reconstructed neighbouring blocks, when the second block is coded according to a given coding mode, i.e. a predefined mode.

The invention also relates to a coding method of a sequence of pictures each picture of the sequence comprising pixels with each of which at least one picture data is associated. The coding method according to the invention comprises the following steps:

a temporal prediction step of picture data taking into account at least one brightness variation model representative of a brightness variation between the images of the sequence, and a coding step of the predicted picture data.

The method according to the invention comprises a selection step of at least one brightness variation model from a set of at least two brightness variation models in such a manner as to minimize a modelling error.

The invention further relates to a coding device of a sequence of pictures each picture of the sequence being divided into blocks of pixels with each of which at least one picture data is associated comprising:

a motion estimation module for estimating at least one motion vector for a current block of the sequence of pictures, a motion compensation module for determining a prediction block for the current block from the at least one motion vector, and a coding module for coding a difference between the current block and the prediction block by taking into account a brightness variation model representative of a brightness variation between the pictures of the sequence. The coding device further comprises a selection module for selecting the brightness variation model from a set of at least two brightness variation models.

Advantageously, the coding method, the coding and decoding devices according to the invention can improve the quality of the reconstructed picture sequence for a given bitrate of the coded data stream, notably in the case of a local brightness variation.

Moreover, the invention relates to a device for decoding a stream of coded data representative of a sequence of pictures, each picture being divided into blocks of pixels with each of which at least one picture data is associated. The decoding device according to the invention comprises:

a decoding module of the stream for reconstructing, for a current block, at least one motion vector and residual data, a motion compensation module for determining a prediction block from at least one motion vector, and a reconstruction module for reconstructing the current block from the prediction block and residual data by taking into account a brightness variation model representative of a brightness variation between the pictures of the sequence.

The decoding device further comprises a selection module for selecting the brightness variation model from a set of at least two brightness variation models.

The invention also relates to a coded picture data structure or to a coded picture data stream, in which an additional data is coded a block of a slice of the sequence indicating that the block is coded according to a temporal prediction mode taking into account a brightness variation model selected from a set of at least two brightness variation models.

4. LIST OF FIGURES

The invention will be better understood and illustrated by means of non-restrictive embodiments and advantageous implementations, with reference to the accompanying drawings, wherein.

5. DETAILED DESCRIPTION OF THE INVENTION

The expression "brightness variation", is also known in English terminology as "luminance variation", "luminosity variation" or "illumination variation". A picture sequence is a series of several pictures. Each picture comprises pixels or picture points with each of which at least one picture data is associated. A picture data is for example a luminance data or a chrominance data. The term "coding mode" is understood as being the set of coding modes authorised by a video coding standard. Generally, they can be classed into INTRA mode, i.e. not implementing a temporal prediction but possibly a spatial prediction, of the block with which they are associated, and into INTER mode i.e. implementing a temporal prediction, of the block with which they are associated.

The term "motion data" is to be understood in the widest sense. It comprises the motion vectors and possibly the reference picture indices enabling a reference picture to be identified in the picture sequence.

The "residual data" term means data obtained after subtracting other data. This term is synonymous with the "residues" term. A residual block is a block of pixels with which residual data is associated.

The "prediction data" term means data used to predict other data. A prediction block is a block of pixels with which prediction data is associated.

A residual block is for example obtained by differentiating pixel by pixel between a prediction block and a current picture data block.

Figure 1:
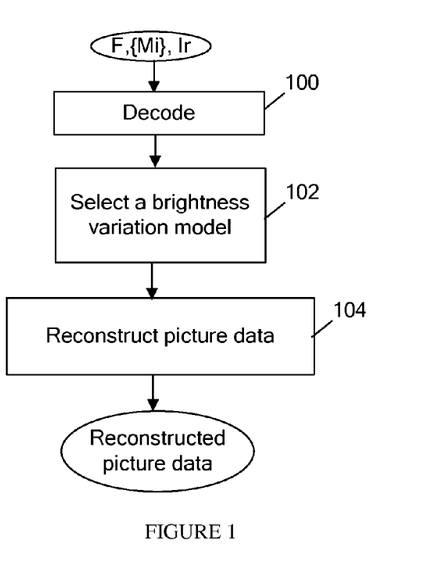
FIG. 1 illustrates a method for decoding a stream of coded data representative of a sequence of pictures according to a first embodiment of the invention.

FIG. 1 shows a method for decoding a stream of coded data F representative of a sequence of pictures according to a first embodiment of the invention.

In step 100, at least one part of the stream F is decoded into decoded data. Step 100 is generally an entropy decoding step of a binary stream. Generally, the decoded data comprises motion data, transformed and quantized residual picture data (i.e. temporally or spatially predicted) or transformed and quantized picture data (i.e. without prediction), etc. According to a variant, the motion data is not decoded but reconstructed by a motion estimation step. This method for reconstructing motion data during the decoding process is known as "template matching". Such a method is described in the document VCEG-AG16 by Steffen Kamp et al entitled *Decoder Side Motion Vector Derivation* and published on 20 Oct. 2007 at Shenzhen in China during the 33$^{rd}$ meeting of the VCEG group of the ITU-T.

In step 102, a brightness variation model Mi is selected from a set M={Mi}$_{i \in [0;I-1]}$ of at least two brightness variation models from at least one part of the data decoded in step 100. The brightness variation model chosen is the model that minimizes a modelling error. This modelling error is calculated between previously reconstructed picture data of the current picture Ic and corresponding data in a previously reconstructed reference picture Ir after filtering of the corresponding data by the selected brightness variation model. The modelling error is for example the mean quadratic error. However, the invention is in no way restricted to the mean quadratic error. According to a variant, the modelling error is the SAD (acronym for "Sum of Absolute Difference") calculated between previously reconstructed picture data of the current picture Ic and corresponding data in a previously reconstructed reference picture Ir after filtering of the corresponding data by the selected brightness variation model.

In step 104, the picture data, e.g. the luminance values of the pixels, is reconstructed from the brightness variation model selected in step 102 and from data decoded in step 100. The picture data Ic(x,y) of the pixel of coordinates (x,y) in the current picture is reconstructed from the following equation:

$$Ic(x,y)=Mi(Ir(x+mvx,y+mvy))+res(x,y),$$

where (mvx, mvy) are the coordinates of the motion vector MV associated with the pixel of coordinates (x,y) in the current picture and where res(x,y) is the residual data associated with the pixel of coordinates (x,y) of the current picture and decoded in step 100 to which an inverse transformation and an inverse quantization has possibly been applied.

Figure 2:
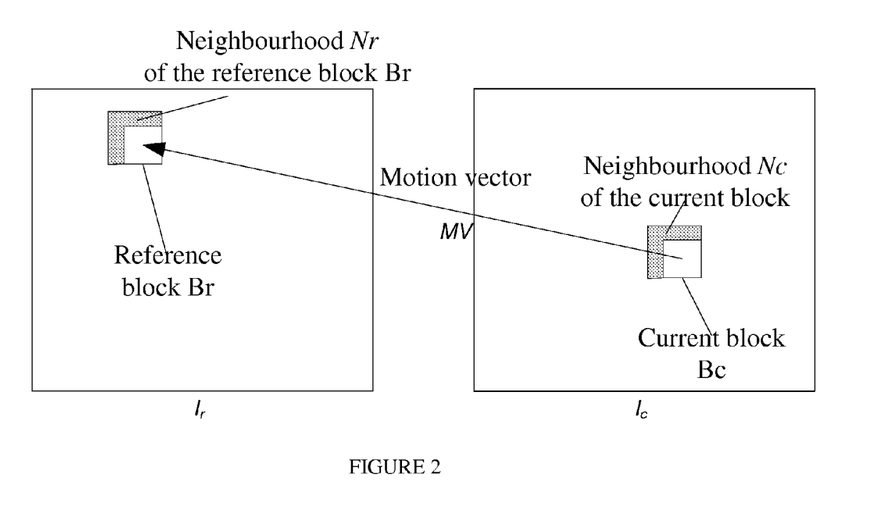
FIG. 2 shows a current picture and a reference picture belonging to a picture sequence as well as a block of current pixels in the current picture and a motion vector pointing to a reference block in the reference picture.

According to a second embodiment illustrated by FIG. 2, the pictures of the sequence of pictures are divided into pixel blocks. In FIG. 2, a current block Bc is located in a current picture Ic. Associated with this current block Bc is a motion vector MV that points to a reference block Br located in a reference picture Ir. The neighbourhood of the current block Bc is noted Nc. The neighbourhood Nc comprises pixels of the current picture Ic situate in proximity to the current block Bc but not necessarily adjacent to this current block Bc. Likewise, the neighbourhood of the reference block Br is noted Nr. The neighbourhood Nr comprises pixels of the reference picture Ir situated in proximity to the reference block but not necessarily adjacent to this reference block Br. This particular embodiment is described with reference to FIG. 3.

Figure 3:
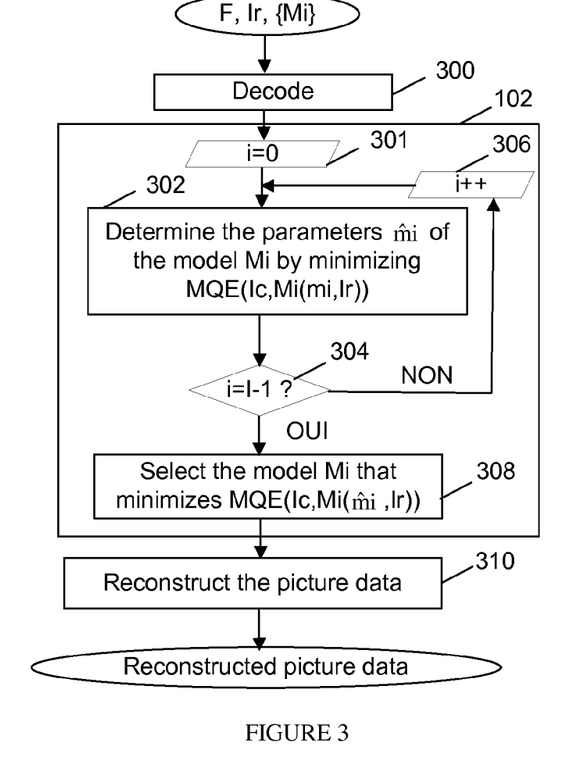
FIG. 3 illustrates a method for decoding a stream of coded data according to a second embodiment of the invention.

In step 300, at least one part of the stream F is decoded into decoded data. Step 300 is identical to step 100 described with reference to FIG. 1.

In step 301, the index i enabling the brightness variation model to be identified in a set M={Mi}$_{i \in [0;I-1]}$ of models is initialized to zero. Each model M$_i$ of the set M depends on one or more parameters.

In step 302, the parameters m̂i of the model Mi are determined by minimizing the mean quadratic error, noted MQE, between the pixels of the neighbourhood Nr of the current block Bc and corresponding pixels reference picture Ir, i.e.

$$\hat{mi} = \underset{mi}{\operatorname{argmin}} \sum_{(x,y) \in Nc} (Ic(x, y) - Mi(mi, Ir(x + mvx, y + mvy)))^2$$

The corresponding pixels are the pixels of the neighbourhood Nr. According to a variant, the corresponding pixels are the pixels colocated with the pixels of the neighbourhood Nc, i.e. the pixels of the reference picture Ir, that have in this reference picture Ir the same coordinates as the coordinates of the pixel of the neighbourhood Nc. In this case, $$\hat{mi} = \underset{mi}{\operatorname{argmin}} \sum_{(x,y) \in Nc} (Ic(x, y) - Mi(mi, Ir(x, y)))^2.$$

In step 304, the index i is compared with 1−1. If i<I−1, then the method goes to step 306, otherwise it goes to step 308.

In step 306, i is incremented by 1 and the method starts from step 302 with a new brightness variation model.

In step 308, once all the brightness variation models of the set M have been determined, i.e. when their respective parameters have been determined, the model $\hat{M}i$ is selected that minimizes the mean quadratic error $$\hat{M}i = \underset{Mi}{\operatorname{argmin}} \sum_{(x,y) \in Nc} (Ic(x, y) - Mi(\hat{mi}, Ir(x + mvx, y + mvy)))^2.$$

In step 310, the picture data of the current block Bc is reconstructed from the brightness variation model $\hat{M}i$ selected in step 308 and from the picture data of the previously reconstructed reference block Br according to the following formula:

$$Bc(x,y)=\hat{M}i(\hat{mi},Br(x+mvx,y+mvy))+res(x,y),$$

where (mvx, mvy) are the coordinates of the motion vector MV associated with the current block Bc and where res(x,y) is the residual data associated with the pixel of coordinates (x,y) of the current picture and decoded in step 100 to which an inverse transformation and an inverse quantization has possibly been applied.

Figure 4:
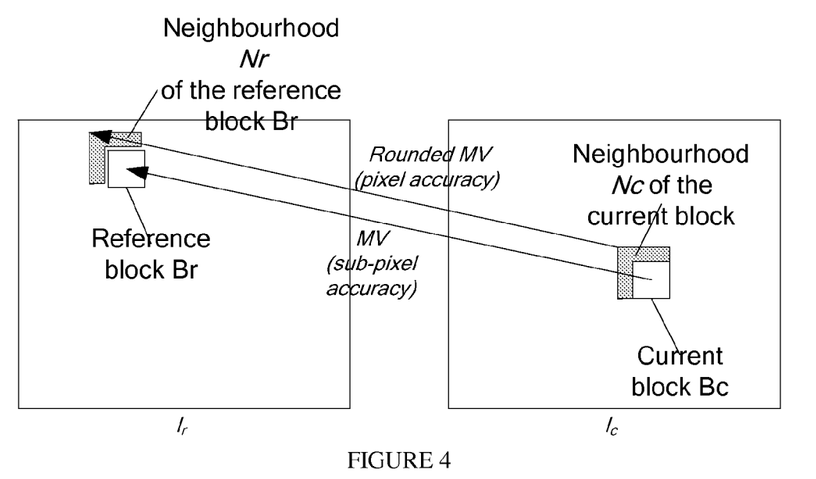
FIG. 4 illustrates a method for rounding off the motion vector according to a variant embodiment of the invention.

According to an advantageous variant illustrated in FIG. 4, the coordinates of the motion vector MV are rounded off to the pixel. This variant can avoid an interpolation of the pixels of the neighbourhood Nr in the reference picture to determine the parameters of the models and to select one of them. Hence at step 302, the parameters of the models are calculated as follows:

$$\hat{mi} = \underset{m}{\operatorname{argmin}} \sum_{(x,y) \in Nc} (Ic(x, y) - Mi(mi, Ir(x + \operatorname{rd}(mvx), y + \operatorname{rd}(mvy))))^2,$$

where rd(.) is the rounding function.

Figure 5:
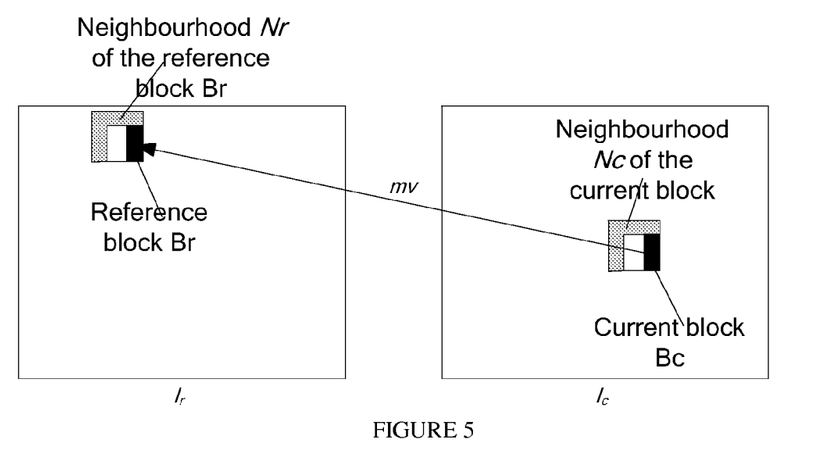
FIG. 5 illustrates a method for selecting the neighbourhood of the current block and of the reference block in the particular case of a division of said blocks into sub-blocks.

According to another particularly advantageous variant, when the block Bc is divided into sub-blocks, the steps 300 to 310 are repeated independently for each sub-block of the block Bc. However, in order to remedy the problem of causality that arises in this case, the neighbourhoods Nc and Nr used for each of the sub-blocks are the same for all the sub-blocks and are the neighbourhoods of the blocks Bc and Br as illustrated in FIG. 5. This variant is particularly advantageous in the event that the sub-blocks of the block Bc are wholly reconstructed only at the end of the reconstruction method of the block Bc as is the case with the standard H.264. The block Bc is a macroblock of size 16×16 that is possibly divided into sub-blocks. All the sub-blocks of the block Bc are temporally predicted to generate a prediction macroblock, then the residual data of the block Bc is reconstructed from a part of the stream F and added to the prediction macroblock. Hence, the picture data of the neighbourhood pixels of a sub-block of the block Bc that belong to the block Bc are not yet reconstructed and cannot therefore be used to determine the parameters of the brightness variation models for this sub-block.

Figure 6:
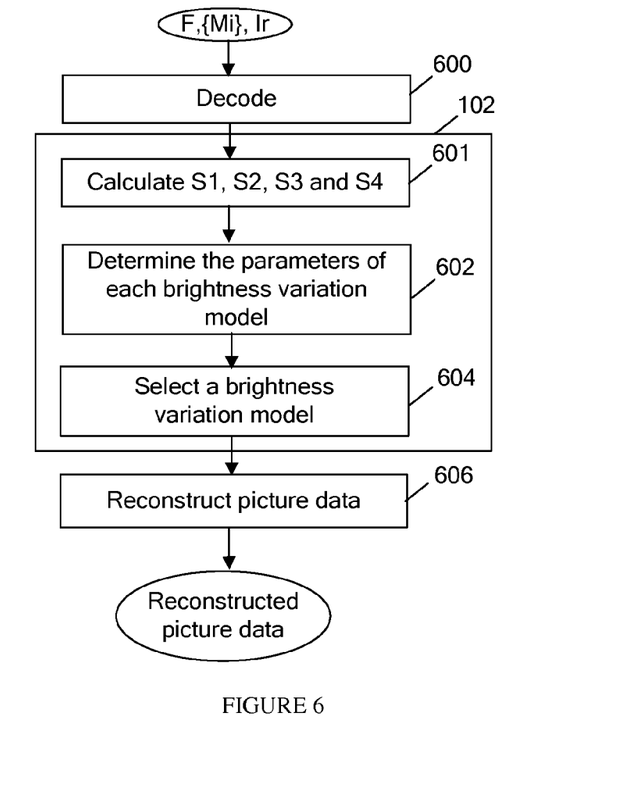
FIG. 6 illustrates a method for decoding a stream of coded data according to a third embodiment of the invention.

According to a third embodiment illustrated by FIG. 6, the decoding method comprises a decoding step 600 of at least one part of the stream F into decoded data. Step 600 is identical to step 100 described with reference to FIG. 1.

In step 601, the following 4 sums are calculated:

$$S1 = \sum_{(x,y) \in N_c} I_c(x, y),$$

$$S2 = \sum_{(x,y) \in N_r} I_r(x, y),$$

$$S3 = \sum_{(x,y) \in N_r} I_r^2(x, y), \text{ and}$$

$$S4 = \sum_{(x,y) \in N_c, (x',y') \in N_r} (I_c(x, y) * I_r(x', y')).$$

If several motion vectors are tested for a same current block Bc (which therefore means that several sets Nr are considered), the sum S1 only needs to be calculated once as it does not depend on the tested motion vector.

In step 602, the parameters $\hat{mi}$ of each of the models Mi of the set M of the models are determined from these 4 sums. In step 604, once all the models of the set M have been determined, i.e. when their respective parameters have been determined, the model $\hat{M}i$ is selected that minimizes the mean quadratic error $$\hat{M}i = \underset{Mi}{\operatorname{argmin}} \sum_{(x,y) \in Nc} (Ic(x, y) - Mi(\hat{mi}, Ir(x + mvx, y + mvy)))^2.$$

In step 606, the picture data of the current block Bc is reconstructed from the brightness variation model selected in step 308 and from the picture data of the previously reconstructed reference block Br according to the following formula:

$$Bc(x,y)=\hat{M}i(\hat{mi},Br(x+mvx,y+mvy))+res(x,y),$$

where (mvx, mvy) are the coordinates of the motion vector MV associated with the current block Bc and where res(x,y) is the residual data associated with the pixel of coordinates (x,y) of the current picture and decoded in step 100 to which an inverse transformation and an inverse quantization has possibly been applied.

Figure 7:
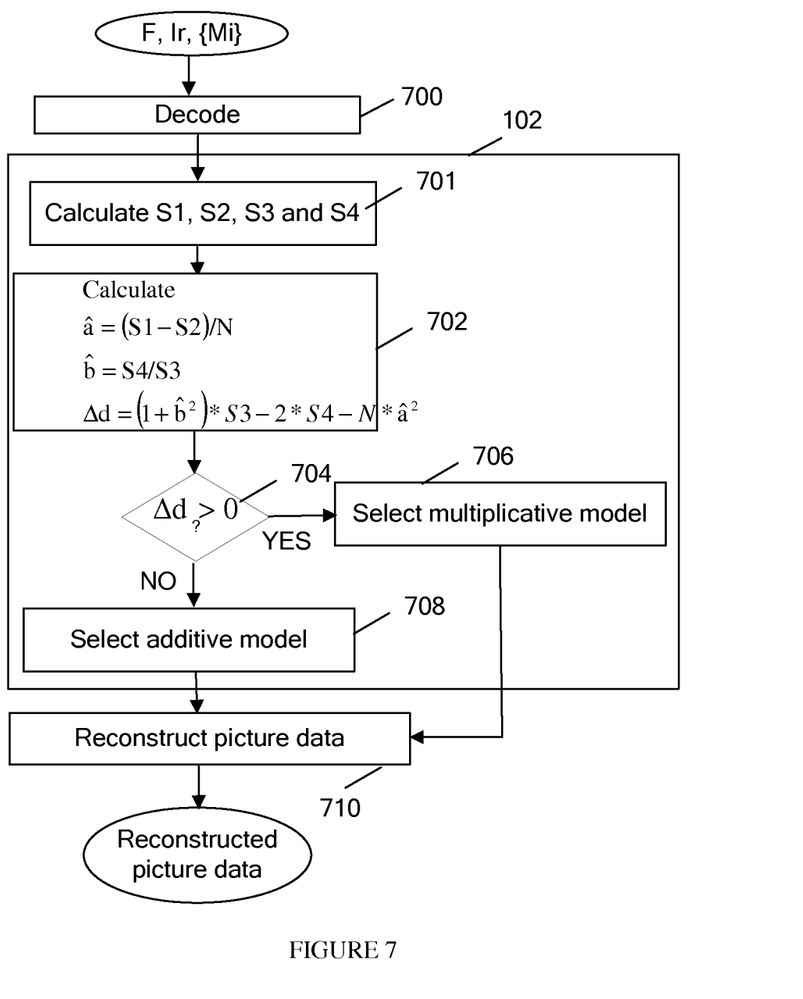
FIG. 7 illustrates a method for decoding a stream of coded data according to a fourth embodiment of the invention.

A fourth particularly advantageous embodiment is described with reference to FIG. 7. This embodiment is applied in the case where the set M comprises two brightness variation models, an additive brightness variation model and a multiplicative brightness variation model. According to the additive model, the prediction data of the current block Bc is equal to a+Ir(x+mvx,y+mvy) and according to the multiplicative model, the prediction data of the current block Bc is equal to b*Ir(x+mvx,y+mvy) where a and b are the parameters of the additive model respectively of the multiplicative model.

The method according to this embodiment comprises a decoding step 700 of at least part of the stream F into decoded data. Step 700 is identical to step 100 described with reference to FIG. 1.

During step 701, the following 4 sums are calculated:

$$S1 = \sum_{(x,y) \in N_c} I_c(x, y),$$

$$S2 = \sum_{(x,y) \in N_r} I_r(x, y),$$

$$S3 = \sum_{(x,y) \in N_r} I_r^2(x, y), \text{ and}$$

$$S4 = \sum_{(x,y) \in N_c, (x',y') \in N_r} (I_c(x, y) * I_r(x', y')).$$

If several motion vectors are tested for a same current block Bc (which therefore means that several sets Nr are considered), the sum S1 only needs to be calculated once as it does not depend on the tested motion vector.

In step 702, the parameters of both models are determined according to the following equations:

$$\hat{a} = (S1 - S2)/N$$

where N is the number of pixels in each of the neighbourhoods Nc and Nr, and $$\hat{b} = S4/S3.$$

During this step 702, the difference Δd between the modelling error of the additive model and the modelling error of the multiplicative model is calculated according to the following formula $$\Delta d = (1 + \hat{b}^2) * S3 - 2 * S4 - N * \hat{a}^2$$

In step 704, the difference Δd is compared with the zero value. If Δd>0 then the multiplicative model is selected in step 706 otherwise the additive model is selected in step 708.

If several motion vectors $MV_k$ (k=0, 1, . . . , M, M>1) are tested during the decoding method for a same current block Bc, it is possible to directly calculate the error $E_k$ associated with each motion vector for the model chosen for this motion vector according to the following equations:
if the chosen model is the additive model, $$E_k = \sum_{N_c} I_c^2 + \sum_{N_r} I_r^2 - 2 \sum_{N_c,N_r} (I_c * I_r) - N * \hat{a}^2$$

if the chosen model is the multiplicative model, $$E_k = \sum_{N_c} I_c^2 + \hat{b}^2 \sum_{N_r} I_r^2$$

The sum $$\sum_{N_c} I_c^2$$

must only be calculated once and not for each tested motion vector, as it does not depend on the tested motion vector.

In step 710, the picture data of the current block Bc is reconstructed from the brightness variation model selected in step 706 or 708 and from the picture data of the previously reconstructed reference block Br according to the following formula:

$$Bc(x,y) = \hat{M}i(\hat{m}i, Br(x+mvx, y+mvy)) + res(x,y),$$

where (mvx, mvy) are the coordinates of the motion vector MV associated with the current block Bc. According to a variant, this embodiment is also applied in the case that the set M comprises at least two brightness variation models from the following models: an additive brightness variation model, a multiplicative brightness variation model and a linear brightness variation model of degree 1 for which the prediction data of the current block Bc is equal to a+Ir(x+mvx,y+mvy)+b.

Figure 8:
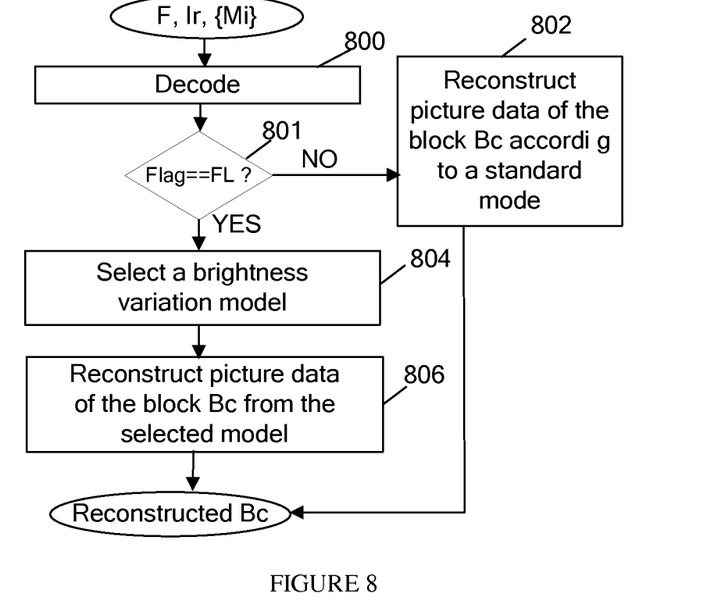
FIG. 8 illustrates a method for decoding a stream of coded data according to a fifth embodiment of the invention.

According to a fifth particularly advantageous embodiment illustrated by FIG. 8, the method according to the invention comprises a decoding step 800 of at least one part of the stream F into decoded data. Step 800 is identical to step 100 with reference to FIG. 1. However, during this step a additional data, called Flag, is decoded. In a variant the additional data Flag is not systematically decoded, but is deduced for certain predefined coding modes, e.g. the skip mode or the INTER 16×16 mode, of the previously reconstructed neighbourhood blocks. The neighbourhood blocks of the current block Bc comprise for example the block situated on top of the current block and the block situated to the left of the current block. For example, if the coding mode of the current block Bc is the skip mode or the INTER 16×16 mode, the additional data Flag of the current block Bc is equal to FL if the additional data Flag of the block situated above the current block Bc and the additional data Flag of the block situated to the left of the current block Bc are equal to FL, otherwise the additional data Flag of the current block Bc has a different value of FL. According to a variant, the neighbourhood blocks of the current block Bc comprise for example the block on top of the current block, the block situated to the left of the current block and the block situated on top and to the left of the current block Bc.

During a step 801, the decoded or deduced Flag data is compared with a predefined value FL. If Flag is not equal to FL, then the picture data of the current block is reconstructed in step 802 from at least one part of the data decoded from the stream F. The reconstruction of the block Bc according to step 802 is a standard reconstruction step, i.e. that is cannot implement a selection step of a brightness variation model. According to a particular embodiment FL=0. According to a variant FL=1.

If Flag is equal to FL, then in step 804, a brightness variation model Mi is selected from a set M={Mi}$_{i \in [0;I-1]}$ of at least two brightness variation models from decoded data or from at least a part of it according to one of the embodiments described with reference to FIGS. 1 to 6.

In step 806, the picture data, e.g. the luminance values of the pixels, is reconstructed from the brightness variation model selected in step 804 and from data decoded in step 800. The picture data Bc(x,y) of the current block Bc where (x,y) represents the coordinates of the pixels in the picture is reconstructed from the following equation:

$$Bc(x,y) = Mi(Br(x+mvx, y+mvy)) + res(x,y),$$

where (mvx, mvy) are the coordinates of the motion vector MV associated with the current block Bc.

The embodiment described with reference to FIG. 8 can be combined with any of the embodiments described with reference to FIGS. 1 to 8 with regard to the selection of the brightness variation model.

The invention also relates to a method for coding a sequence of pictures. A first embodiment is described with reference to FIG. 9.

Figure 9:
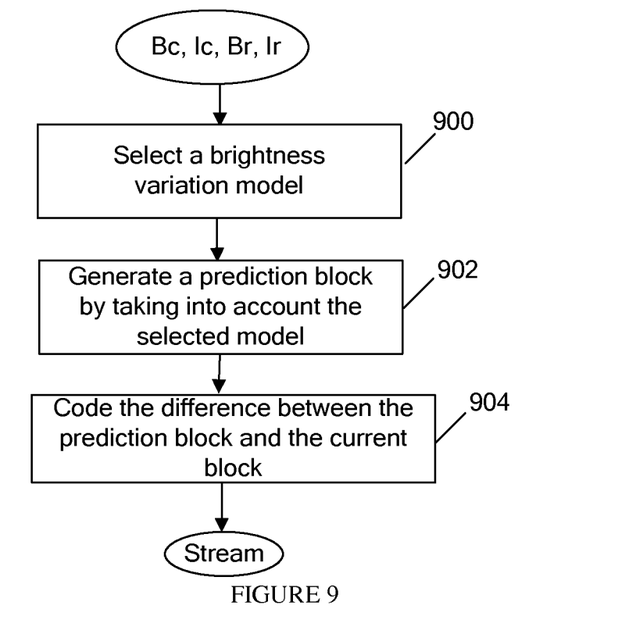
FIG. 9 illustrates a method for coding a stream of coded data according to a first embodiment of the invention.

In step 900, a brightness model $\hat{M}i$ is selected for the block Bc in a set M of at least two brightness models according to one of the embodiments of the decoding method previously described with reference to FIGS. 1 to 7 (steps 102, 301 to 308, 602 to 604 or 701 to 708).

In step 902, a prediction block Bpred is generated for the current block Bc from a previously determined reference block Br and from the brightness variation model $\hat{M}i$ selected in step 900. The prediction block noted Bpred is defined as follows:

$$Bpred(x,y)=\hat{M}i(\hat{m}i,Br(x+mvx,y+mvy)),$$

where (mvx, mvy) are the coordinates of a motion vector MV associated with the current block Bc.

In step 904, the pixel to pixel difference between the current block Bc and the prediction block Bpred is coded. This coding step in addition to the entropy coding step possibly comprises the transformation steps, e.g. by DCT (Discrete Cosine Transform) and quantization if such steps are required.

Figure 10:
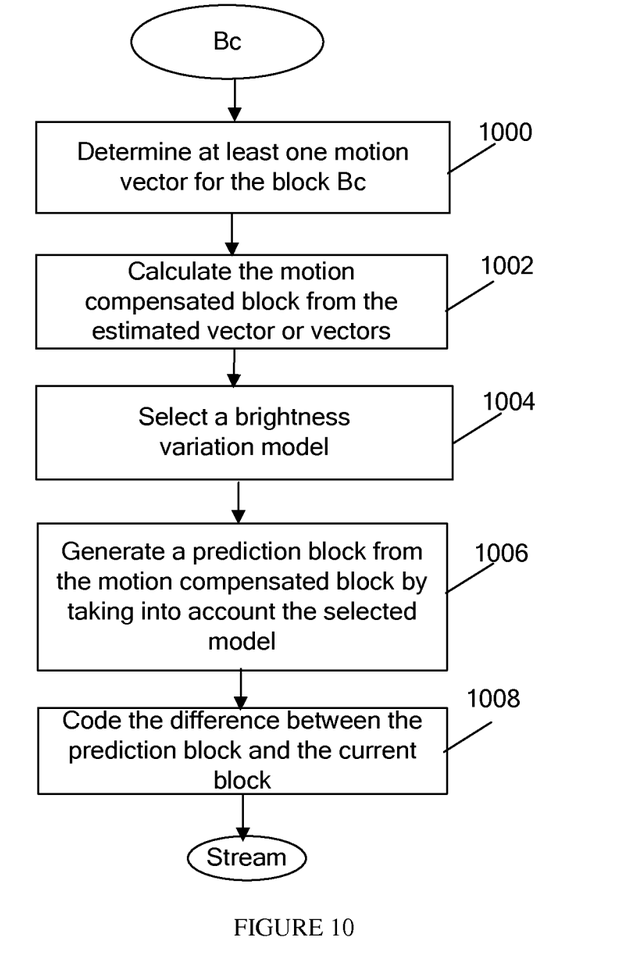
FIG. 10 illustrates a method for coding a stream of coded data according to a second embodiment of the invention.

A second embodiment is described with reference to FIG. 10. In step 1000, at least one motion vector is determined for the current block Bc to code. According to a particular embodiment, during the motion estimation step 1000, account is only taken of an additive brightness variation model, i.e. that, for the current block Bc, a motion vector and a parameter a are determined in such a manner as to minimize an error Err between the current block Bc and the block Br in the reference picture identified by means of the vector and weighted by the parameter a, i.e. Err(Bc(x,y), a+Br(x+mvx, y+mvy)). According to a variant, account is taken of the totality of the brightness variation models of the set M. In this case, for the current block Bc and for each brightness variation model $\hat{M}i$ of the set M, a motion vector MV(mvx, mvy) and an optimum set of parameters $\hat{m}i$ is determined in such a manner as to minimize an error between the current block Bc and the block Br in the reference picture identified by means of the vector and weighted by the model with the associated parameter set, i.e. Err(Bc(x,y), $\hat{M}i$ ($\hat{m}i$,Br(x+mvx,y+mvy))).

In step 1002, a motion compensated block Br is determined from the motion vector or vectors determined in step 1000 and the reference picture Ir. During this step, an interpolation of the pixels of the picture Ir may be necessary particularly in the case where the motion vector MV has non-integer coordinates.

In step 1004, a brightness variation model $\hat{M}i$ is selected for the current block Bc in a set M of at least two brightness variation models according to one of the embodiments of the decoding method previously described with reference to FIGS. 1 to 7 (steps 102, 301 to 308, 602 to 604 or 701 to 708).

In step 1006, a prediction block Bpred is generated for the current block Bc from the motion compensated block Br(x+mvx,y+mvy) determined in step 1002 and from the brightness variation model selected in step 1004 in the following manner:

$$Bpred(x,y)=\hat{M}i(\hat{m}i,Br(x+mvx,y+mvy)))$$

In step 1008, a residual block is generated by subtracting the prediction block Bpred pixel by pixel from the current block Bc. This residual block is then coded in step 1010 into a stream F of coded data. Step 1008 generally implements a transformation step followed by a quantization step of the residual picture data.

Figure 11:
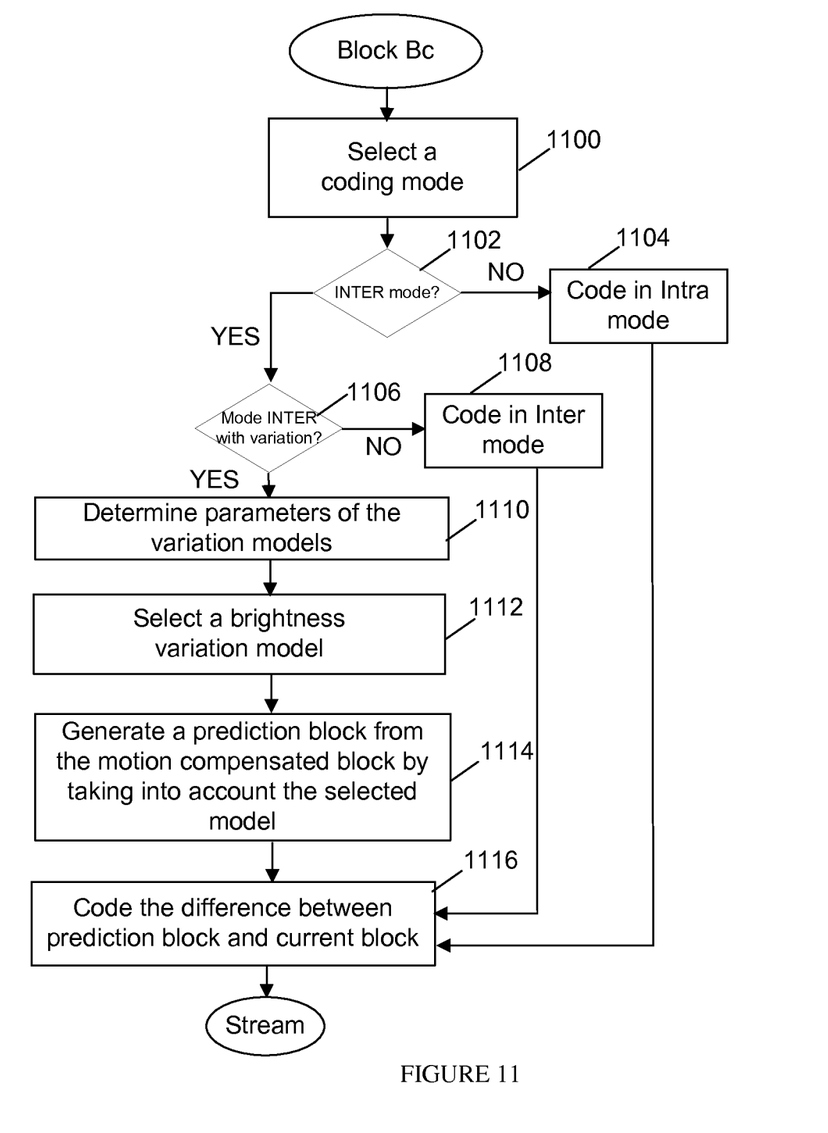
FIG. 11 illustrates a method for coding a stream of coded data according to a third embodiment of the invention.

A third embodiment is described with reference to FIG. 11.

In step 1100, a coding mode is determined for the current block Bc for example according to a bitrate-distortion type criterion.

In step 1102, it is determined whether the selected coding mode is an INTER mode. If this is not the case, then in step 1104, the block Bc is coded according to an INTRA coding mode, i.e. without temporal prediction, with possibly a spatial prediction as is the case in the case of the standard H.264.

If the selected coding mode is an INTER mode, then the method goes to step 1106. It is then determined whether the selected coding mode is a mode that takes into account a brightness variation model. If this is not the case, then the method goes to step 1108 and the block Bc is coded according to a standard INTER mode, i.e. without weighting of the prediction block Bpred by a brightness variation model.

If on the contrary, the selected coding mode is a mode that takes into account a brightness variation model then the method goes to step 1110. In step 1110, the parameters $\hat{m}i$ of each of the models $\hat{M}i$ of the set of models are determined.

In step 1112, once all the models of the set M have been determined, i.e. when their respective parameters have been determined, the model $\hat{M}i$ is selected that minimizes the mean quadratic error $$\hat{M}i = \underset{Mi}{\mathrm{argmin}} \sum_{(x,y)\in Nc} (Ic(x, y) - Mi(\hat{m}i, Ir(x + mvx, y + mvy)))^2.$$

In step 1114, a prediction block Bpred is generated for the current block Bc from the motion compensated block Br(x+mvx,y+mvy) and from the brightness variation model selected in the following manner:

$$Bpred(x,y)=\hat{M}i(\hat{M}i,Br(x+mvx,y+mvy)))$$

The steps 1112 and 1114 are equivalent to step 1004.

In step 1116, the current block Bc is coded, i.e. that the difference between the block Bc and the prediction block Bpred weighted by the model selected in step 1112 is coded possibly after transformation and quantization.

Figure 12:
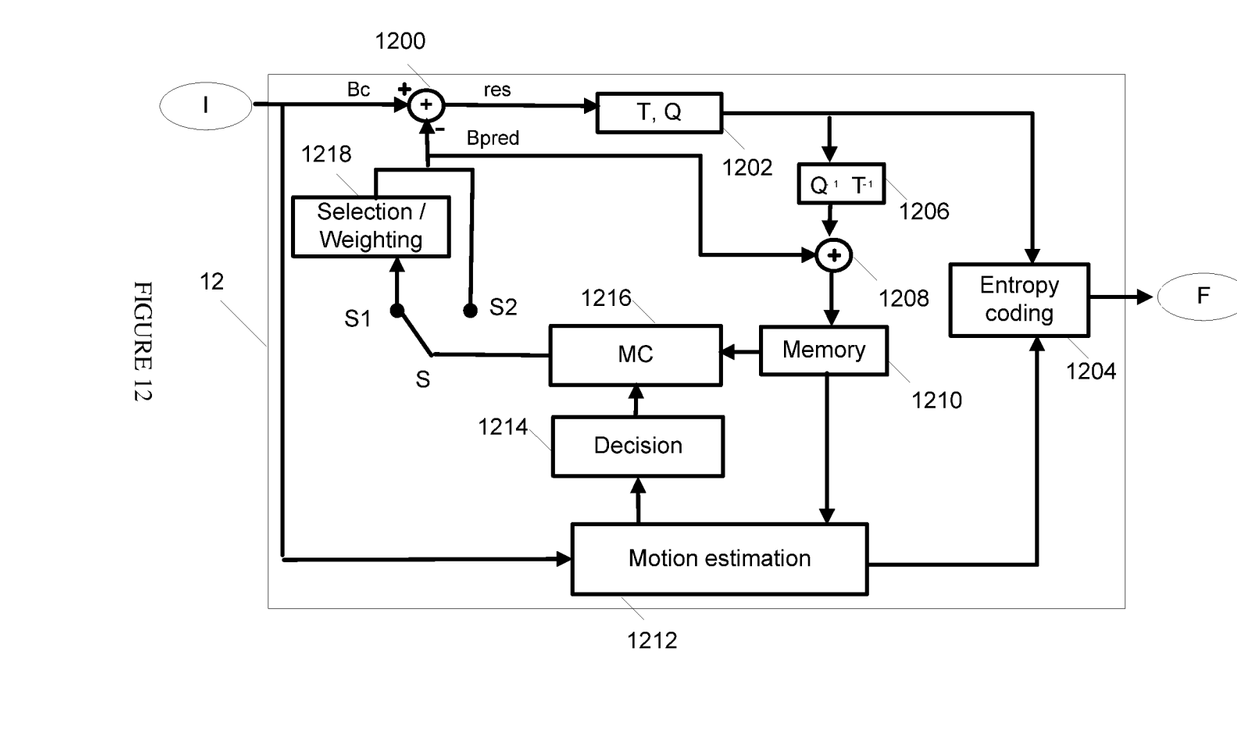
FIG. 12 illustrates a coding device according to the invention.

The invention further relates to a coding device 12 described with reference to FIG. 12. The coding device 12 receives at the input pictures I belonging to a sequence of pictures. Each picture is divided into blocks of pixels with each of which at least one picture data is associated. The coding device 12 notably implements a coding with temporal prediction. Only the modules of the coding device 12 relating to the coding by temporal prediction or INTER coding are shown in FIG. 12. Other modules not shown and known by those skilled in the art of video coders implement the INTRA coding with or without spatial prediction. The coding device 12 notably comprises a calculation module 1200 capable of subtracting a prediction block Bpred pixel by pixel from a current block Bc to generate a residual picture data block or residual block noted res. It further comprises a module 1202 capable of transforming then quantizing the residual block res into quantized data. The transform T is for example a discrete cosine transform (or DCT). The coding module 12 further comprises an entropy coding module 1204 capable of coding the quantized data into a stream F of coded data. It further comprises a module 1206 performing the inverse operation of the module 1202. The module 1206 performs an inverse quantization $Q^{-1}$ followed by an inverse transformation $T^{-1}$. The module 1206 is connected to a calculation module 1208 capable of adding pixel by pixel the block from the module 1206 and the prediction block Bpred to generate a block of reconstructed picture data that is stored in a memory 1210.

The coding device 12 further comprises a motion estimation module 1212 capable of estimating at least one motion vector between the block Bc and a block of a reference picture Ir stored in the memory 1210, this picture having previously been coded then reconstructed. According to a variant, the motion estimation can be carried out between the current block Bc and the original reference picture Ic in which case the memory 1210 is not connected to the motion estimation module 1212. According to a method well known to those skilled in the art, the motion estimation module searches the reference picture Ir for a motion vector in such a manner as to minimize an error calculated between the current block Bc and a block in the reference picture Ir identified by means of said motion vector. According to the invention, the motion estimation module 1212 is suitable to take into account brightness variation model. According to a particular embodiment, the motion estimation step 1212 only takes into account an additive brightness variation model, i.e. that the module determines, for the current block Bc, a motion vector and a parameter a in such a manner as to minimize an error between the current block and a block Br identified in a reference picture Ir stored in the memory 1210 by means of the motion vector MV(mvx,mvy) and weighted by the parameter a, i.e. Err(Bc(x,y), a+Br(x+mvx,y+mvy)). According to a variant, the motion estimation module 1212 takes into account all of the brightness variation models of the set M. In this case, the motion estimation module 1212 determines, for the current block Bc and for each brightness variation model Mi of the set M, a motion vector (mvx, mvy) and an optimum set of parameters m̂i for example in such a manner as to minimize an error between the current block and the block in the reference picture identified by means of the vector and weighted by the model with the associated parameter set, i.e. Err(Bc(x,y), Mi(mi,Br(x+mvx,y+mvy))). The motion estimation module 1212 is also capable of determining motion vectors without taking into account a brightness variation model.

The motion data determined with or without weighting by a brightness variation model are transmitted by the motion estimation module 1212 to a decision module 1214 capable of selecting a coding mode for the block Bc in a predefined set of coding modes. The chosen coding mode is for example the one that minimizes a bitrate-distortion type criterion. However, the invention is not restricted to this selection method and the mode chosen can be selected according to another criterion for example an a priori type criterion. The coding mode selected by the decision module 1214 as well as the motion data, e.g. the motion vector or vectors in the case of the temporal prediction mode or INTER mode are transmitted to a motion compensation module 1216. The motion vector or vectors and the selected coding mode are further transmitted to the entropy coding module to be coded in the stream F. The motion compensation module 1216 next determines in the reference picture Ir previously reconstructed and stored in the memory 1210, the prediction block Bpred from the motion vector determined by the motion estimation module 1212 and from the coding mode determined by the decision module 1214. In the case where the coding mode chosen by the decision module 1214 in an INTER coding mode with recognition of a brightness variation model, a switch S is set to position S0.

In the case where the coding mode chosen by the decision module 1214 is an INTER coding mode with recognition of a brightness variation model, the switch S is set to position S1.

If the switch is in position S1, then the prediction block Bpred is weighted by a brightness variation model selected from a set of at least two models by the selection module 1218. The selection module 1218 implements the selection step of the brightness variation model according to one of the embodiments described previously in relation to FIGS. 1 to 7 (steps 102, 301 to 308, 602 to 604 or 701 to 708).

The modules 1200, 1202, 1204, 1206, 1210, 1214 form a group of modules called coding modules. The coding module is capable of coding a difference between the current block and the prediction block by taking into account a brightness variation model representative of a variation in brightness between the pictures of the sequence.

The invention further relates to a decoding device 13 described with reference to FIG. 13. The decoding device 13 receives at the input a stream F of coded data representative of a sequence of pictures. The stream F is for example transmitted by a coding device 12. The decoding device 13 comprises an entropy decoding module 1300 capable of generating decoded data, e.g. coding modes and decoded data relating to the content of the pictures, i.e. the residual data.

The decoding device 13 further comprises a motion data reconstruction module. According to a first embodiment, the motion data reconstruction module is the entropy decoding module 1300 that decodes a part of the stream F representative of said motion vectors.

Figure 13:
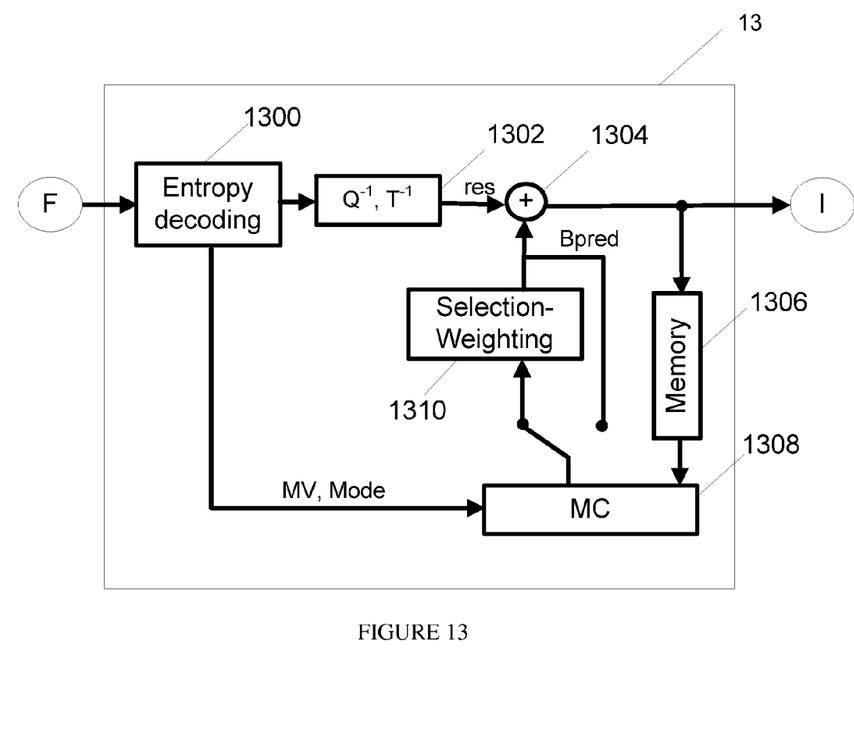
FIG. 13 illustrates a decoding system according to the invention.

According to a variant not shown in FIG. 13, the motion data reconstruction module is a motion estimation module. This solution for reconstructing motion data by the decoding device 13 is known as "template matching".

The decoded data relating to the content of the pictures is then sent to a module 1302 capable of carrying out an inverse quantization followed by an inverse transformation. The module 1302 is identical to the module 1202 of the coding module 12 having generated the coded stream F. The module 1302 is connected to a calculation module 1304 capable of adding pixel by pixel the block from the module 1302 and a prediction block Bpred to generate a block of reconstructed picture data that is stored in a memory 1306. The decoding device 13 further comprises a motion compensation module 1308 identical to the module 1216 of the coding device 12. The motion compensation module 1308 next determines, in a reference picture Ir previously reconstructed and stored in the memory 1306, the prediction block Bpred from the motion vector MV and the decoded coding mode for the current block Bc by the entropy decoding module 1300. In the case where the decoded coding mode is an INTER coding mode without recognition of a brightness variation mode, a switch S is set to position S0.

In the case where the coding mode is an INTER coding mode with recognition of a brightness variation model, the switch S is set to position S1.

If the switch is in position S1, then the prediction block Bpred is weighted by a brightness variation model selected from a set of at least two models by the selection module 1310. The selection module 1310 is identical to the selection module 1218.

The modules 1302, 1304, 1306 form a group of modules called reconstruction module. The reconstruction module is capable of reconstructing the current block from the prediction block and residual data by taking into account a brightness variation model representative of a variation in brightness between the pictures of the sequence.

The invention also relates to a stream F of coded data or to a coded picture data structure, in which an additional data is coded for each block coded in INTER mode which indicates whether the said block is coded according to a temporal prediction mode taking into account a brightness variation model selected from a set of at least two brightness variation models. According to a variant, this additional data is coded for each block coded in INTER mode with the exception of blocks coded according to one or more particular predefined modes, for example according to the SKIP mode or according to the INTER 16×16 mode. In the particular case of blocks coded according to one of these particular modes, this additional data is not explicitly coded in the stream but is deduced in the coding device from additional data of neighbourhood blocks of the coded block according to one of these particular modes.

Obviously, the invention is not limited to the embodiment examples mentioned above.

In particular, the person skilled in the art may apply any variant to the stated embodiments and combine them to benefit from their various advantages. Notably, the embodiment described with reference to FIG. 8 can be combined with any of the embodiments described with reference to FIGS. 1 to 8 with regard to the selection of the brightness variation model.

The invention claimed is:

1. A method for decoding a sequence of pictures, said pictures being divided into blocks of pixels with each of which at least one picture data is associated, said method comprising:

reconstructing picture data of a current block of a current picture from a reference block of a reference picture and from decoded data by taking into account a brightness variation model, wherein said brightness variation model is selected from at least an additive brightness variation model and a multiplicative brightness variation model by:

calculating a first sum $S_1$ of previously reconstructed picture data of the neighbouring pixels of said current block, calculating a second sum $S_2$ of picture data of corresponding pixels in the reference picture, calculating a third sum $S_3$ of squared picture data of corresponding pixels in the reference picture, and calculating a fourth sum $S_4$ of products of the previously reconstructed picture data of the neighboring pixels of said current block and the picture data of corresponding pixels in the reference picture, and selecting said multiplicative brightness variation model if a difference $\Delta d$ is positive and selecting the additive brightness variation model otherwise, with $\Delta d = (1+\hat{b}^2)*S_3 - 2*S_4 - N*\hat{a}^2$; where:

$\hat{b}$ is the parameter of the multiplicative brightness variation model and is equal to $S_4/S_3$;

$\hat{a}$ is the parameter of the additive brightness variation model and is equal to $(S_1-S_2/N)$, and N is the number of neighboring pixels of said current block.

2. The method according to claim 1, wherein said corresponding pixels are neighboring pixels of a reference block of the reference picture are co-located with the current block.

3. The method according to claim 1, wherein said corresponding pixels are neighboring pixels of a reference block of the reference picture identified by a motion vector associated with said current block.

4. The method according to claim 3, further comprising rounding the coordinates of said motion vector associated with said current block to a whole pixel value.

5. The method according to claim 1, wherein said current block is divided into sub-blocks, and wherein said selecting of said brightness variation model is applied separately to each sub-block.

6. The method according to claim 5, wherein said corresponding pixels for each of the sub-blocks are the neighboring pixels of said reference block associated with the current block.

7. The method according to claim 1, further comprising decoding additional data indicating for a first block whether said first block is temporally predicted according to a temporal prediction mode taking into account a brightness variation model selected from a set of at least two brightness variation models.

8. The method according to claim 7, further comprising determining an additional data for a second block from the value of the additional data associated with previously reconstructed neighboring blocks, when said second block is coded according to a predefined coding mode.

9. A coding method of a sequence of pictures, said pictures being divided into blocks of pixels with each of which at least one picture data is associated, said method comprising:

temporally predicting picture data of a current block of a current picture from a reference block of a reference picture by taking into account a brightness variation model;

coding said predicted picture data;

wherein said brightness variation model is selected from at least an additive brightness variation model and a multiplicative brightness variation model by:

calculating a first sum $S_1$ of previously reconstructed picture data of neighbouring pixels of said current block;

calculating a second sum $S_2$ of picture data of corresponding pixels in the reference picture;

calculating a third sum $S_3$ of squared picture data of corresponding pixels in the reference picture; and calculating a fourth sum $S_4$ of products of the previously reconstructed picture data of the neighbouring pixels of said current block and the picture data of corresponding pixels in the reference picture; and selecting said multiplicative brightness variation model if a difference $\Delta d$ is positive and selecting the additive brightness variation model otherwise, with $\Delta d = (1+\hat{b}^2)*S_3 - 2*S_4 - N*\hat{a}^2$; where:

$\hat{b}$ is the parameter of the multiplicative brightness variation model and is equal to $S_4/S_3$;

$\hat{a}$ is the parameter of the additive brightness variation model and is equal to $(S_1-S_2/N)$, and N is the number of neighboring pixels of said current block.

10. The coding method according to claim 9, wherein said corresponding pixels are neighboring pixels of a reference block of the reference picture co-located with the current block.

11. The coding method according to claim 9, wherein said corresponding pixels are neighboring pixels of a reference block of the reference picture identified by a motion vector associated with said current block.

12. The coding method according to claim 11, wherein coordinates of said motion vector associated with said current block are rounded to a whole pixel value.

13. The coding method according to claim 9, further comprising dividing said current block into sub-blocks, said selecting of the brightness variation model being applied separately to each sub-block.

14. The coding method according to claim 11, wherein said corresponding pixels for each of the sub-blocks are the neighboring pixels of said reference block associated with the current block.

15. The coding method according to claim 9, further comprising encoding an additional data indicating for a first block whether said first block is temporally predicted according to a temporal prediction mode taking into account a brightness variation model selected from a set of at least two brightness variation models.

16. A device for decoding a sequence of pictures, said pictures being divided into blocks of pixels with each of which at least one picture data is associated, said device comprising a processor and a memory configured to:
  reconstruct picture data of a current block of a current picture from a reference block of a reference picture and from decoded data by taking into account a brightness variation model,
wherein said brightness variation model is selected from at least an additive brightness variation model and a multiplicative brightness variation model by:
  calculate a first sum $S_1$ of previously reconstructed picture data of neighbouring pixels of said current block;
  calculate a second sum $S_2$ of picture data of corresponding pixels in the reference picture;
  calculate a third sum $S_3$ of squared picture data of corresponding pixels in the reference picture;
  calculate a fourth sum $S_4$ of products of the previously reconstructed picture data of the neighbouring pixels of said current block and the picture data of corresponding pixels in the reference picture; and
  select said multiplicative brightness variation model if a difference $\Delta d$ is positive and selecting the additive brightness variation model otherwise, with $$\Delta d = (1+\hat{b}^2)*S_3 - 2*S_4 - N*\hat{a}^2, \text{ where:}$$

$\hat{b}$ is the parameter of the multiplicative brightness variation model and is equal to $S_4/S_3$;
$\hat{a}$ is the parameter of the additive brightness variation model and is equal to $(S_1-S_2/N)$, and
N is the number of neighboring pixels of said current block.

17. The decoding device according to claim 16, wherein said corresponding pixels are neighboring pixels of a reference block of the reference picture co-located with the current block.

18. The decoding device according to claim 16, wherein said corresponding pixels are neighboring pixels of a reference block of the reference picture identified by a motion vector associated with said current block.

19. The decoding device according to claim 18, wherein the coordinates of said motion vector associated with said current block are rounded to a whole pixel value.

20. The decoding device according to claim 16, wherein said current block is divided into sub-blocks and said selection of the brightness variation model is applied separately to each sub-block.

21. The decoding device according to claim 20, wherein said corresponding pixels for each of the sub-blocks are the neighboring pixels of said reference block associated with the current block.

22. The decoding device according to claim 16, wherein the processor and memory are further configured to decode an additional data indicating for a first block whether said first block is temporally predicted according to a temporal prediction mode taking into account a brightness variation model selected from a set of at least two brightness variation models.

23. The decoding device according to claim 22, wherein the processor and memory are further configured to determine an additional data for a second block from the value of the additional data associated with previously reconstructed neighboring blocks, when said second block is coded according to a predefined coding mode.

24. A device for coding a sequence of pictures, said pictures being divided into blocks of pixels with each of which at least one picture data is associated, said device comprising a processor and memory configured to:
  temporally predict picture data of a current block of a current picture from a reference block of a reference picture by taking into account a brightness variation model; and
  code said predicted picture data;
wherein said brightness variation model is selected from at least an additive brightness variation model and a multiplicative brightness variation model by:
  calculating a first sum S1 of previously reconstructed picture data of neighbouring pixels of said current block;
  calculating a second sum S2 of picture data of corresponding pixels in the reference picture;
  calculating a third sum S3 of squared picture data of corresponding pixels in the reference picture;
  calculating a fourth sum S4 of products of the previously reconstructed picture data of the neighbouring pixels of said current block and the picture data of corresponding pixels in the reference picture, and
  selecting said multiplicative brightness variation model if a difference $\Delta d$ is positive and selecting the additive brightness variation model otherwise, with $$\Delta d = (1+\hat{b}^2)*S_3 - 2*S_4 - N*\hat{a}^2, \text{ where:}$$

$\hat{b}$ is the parameter of the multiplicative brightness variation model and is equal to $S_4/S_3$;
$\hat{a}$ is the parameter of the additive brightness variation model and is equal to $(S_1-S_2/N)$, and
N is the number of neighboring pixels of said current block.

25. The coding device according to claim 24, wherein said corresponding pixels are neighboring pixels of a reference block of the reference picture co-located with the current block.

26. The coding device according to claim 24, wherein said corresponding pixels are neighboring pixels of a reference block of the reference picture identified by a motion vector associated with said current block.

27. The coding device according to claim 26, wherein the coordinates of said motion vector associated with said current block are rounded to a whole pixel value.

28. The coding device according to claim 24, wherein said current block being divided into sub-blocks selecting said brightness variation model is applied separately to each sub-block.

29. The coding device according to claim 28, wherein said corresponding pixels for each of the sub-blocks are the neighbouring pixels of said reference block associated with the current block.

30. The coding device according to claim 24, wherein device is further configured to encode an additional data indicating for a first block whether said first block is temporally predicted according to a temporal prediction mode taking into account a brightness variation model selected from a set of at least two brightness variation models.

* * * * *